Sept. 24, 1963     C. F. LLOYD-YOUNG     3,104,467
GLASS CUTTING GUIDES, GAUGES AND JIGS
Filed April 10, 1961

INVENTOR.
CARYSFORT F. LLOYD-YOUNG
BY
Robinson & Berry
ATTORNEYS

United States Patent Office 3,104,467
Patented Sept. 24, 1963

3,104,467
GLASS CUTTING GUIDES, GAUGES AND JIGS
Carysfort F. Lloyd-Young, 303 E. Pike St., Seattle, Wash.
Filed Apr. 10, 1961, Ser. No. 101,830
2 Claims. (Cl. 33—75)

This invention relates to improvements in glass cutting guides, gauges and jigs. More particularly, it resides in the provision of a guide to be used in conjunction with a present day common form of tool for the cutting of glass plate as, for example, the rounding of corners, for notching, for corner angling or for the dividing of the plate by straight line cuts.

It is also an object of the present invention to provide such a gauge and guide in the form of a thin, flat metal plate which is formed with scribing edges, slots and notches to receive and guide the glass cutting tool for the making of radially curved or straight line cuts as may be required to form recesses or notches of certain definite dimensions; to form angle cuts of predetermined degree; and to make curving cuts of predetermined radii.

Further objects and advantages of the invention reside in the details of construction of the present gauge plate and in the manner of use therewith of the designated glass cutting tool to define the boundry lines for notches and to make curves and straight line cuts, as desired or required.

In accomplishing the above mentioned and other objects of the present invention, I have provided the improved details of construction, the preferred forms of which are illustrated in the accompanying drawings, wherein.

Figure 1:
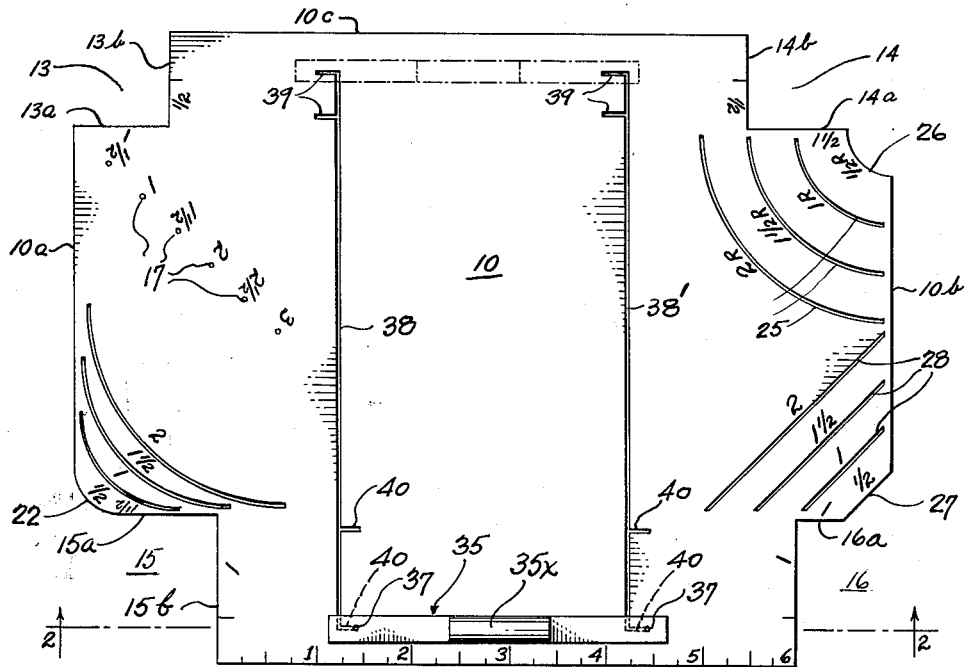
FIG. 1 is a top view of a glass cutting gauge in which the improved features of the present invention are embodied.

Referring more in detail to the drawings:

The gauge of this invention is designated in its entirety by reference numeral 10. Preferably it comprises a thin, light weight and rigid sheet of a suitable metal such as stainless steel. This plate is of substantially rectangular form and is notched at its four corners and formed, in its main body portion, with cutter guiding slots, as will presently be described in detail. The use with this plate 10 of a well known form of glass cutting tool is intended. This particular type of tool has been shown in FIG. 3 wherein it is designated in its entirety by reference numeral 12 and is there seen to comprise a handle portion 12h that is equipped at its lower end with a disk or wheel type cutting member 13 which in use is adapted to be guided by an edge portion of the plate 10 or within a slot cut in the plate, as has been illustrated in FIG. 3.

The gauge plate 10, as seen in FIG. 1, has straight, parallel opposite side edges 10a and 10b, and straight, parallel top and bottom edges 10c and 10d. The lower edge portion of the plate is here shown to be graduated in inches and fractional portions thereof and this type of graduating might, if desired or required, be applied to one or all other edges of the plate.

It is also to be observed that, at its upper left hand corner, the plate 10, as shown in FIG. 1, is notched, as at 13, in such manner as to provide horizontal and vertical cutter guiding edges 13a and 13b that are at right angles to each other and also to those edges of the plate from which they extend. At its upper right hand corner, the plate is similarly notched as at 14 to provide cutter guiding edges 14a and 14b which also are at a right angle to each other and perpendicular to the lines of the edges from which they extend.

The notch defining edges at the top, left hand corner of the plate are of equal length. Herein this length has been indicated as being one inch and the edges are graduated in inch and lesser fractional designations. The notch defining edge 14b of the notch 14 at the right hand corner of the plate is set one and one-half inches inwardly from the line of the edge 10b of the plate 10 and the notch edge 14a is graduated accordingly.

Likewise, the opposite lower edge corners of the plate 10 are notched as at 15 and 16. The notch 15 provides defining edges 15a and 15b at right angles to each other and to the edges of the plate from which they extend and the plate may be graduated along these edges in inches and fractional portions thereof; it being indicated that each of these notches has a depth of one and one-half inches inwardly from the lines 10a and 10b.

Formed in the plate 10 along a line that bisects the angle as formed by plate edge 10a and notch edge 13a, is a succession of small holes 17 drilled perpendicularly through the plate. These holes are located at predetermined and definite distances from the plate edges. As here indicated, they are spaced at ½ inch intervals from the edges. The purpose of these holes is to enable the user of the gauge plate to definitely establish and mark, by means of a pointed tool applied through a selected hole 17, the place for applying the point of the drill bit for drilling a hole at a designated distance from the edge of the glass plate.

It is also to be observed in FIG. 1 that a succession of arcuate slots 20 are formed about center points located in a line that bisects the angle formed by the plate edge 10a and the notch edge 15a, the radii of the slots progressively increasing to provide guide slots of decreasing curvature as their center points increase in distance from the angle defining edges. Each slot extends through an arc 90° and the corresponding ends of the several slots terminate in lines that are close to and parallel with the edges 10a and 15a.

It is further to be observed that the corner as provided between edges 10a and 15a is similarly rounded as at 22 to provide a scribing or tool guiding edge of ½ inch radius.

It is preferred that the center points of curvature of the arcuate edge 22 and the several slots 20 be evenly spaced at ½ inch intervals. However, this is not a fixed distance and may be varied as may be desired or required to suit the requirements of the user.

It is also a desirable feature of this gauge plate 10 that the corner portion that is defined between the edge lines 10b and 14a be formed with a succession of radial slots 25 formed about a center of curvature that is located at the intersection of the extended lines of edges 14a and 10b. These arcuate slots extending through arcs of 90° and have corresponding ends terminating in lines that are closely adjacent and parallel to these edges. These arcuate lines are preferably spaced at one half inch intervals and the corner of the angle is cut off in an arcuately curved edge 26 that is formed about the same center as the slots 25.

That corner portion of the plate that is defined by the plate edges 10b and 16a is cut on a bevel of 45° to provide a cutter guiding edge 27 and formed in that corner portion of the plate, parallel to edge 27 and at regular intervals of spacing, are straight line slots 28 which have their corresponding ends terminating in lines that are closely adjacent and parallel with the edges 10b and 16a.

Figure 3:
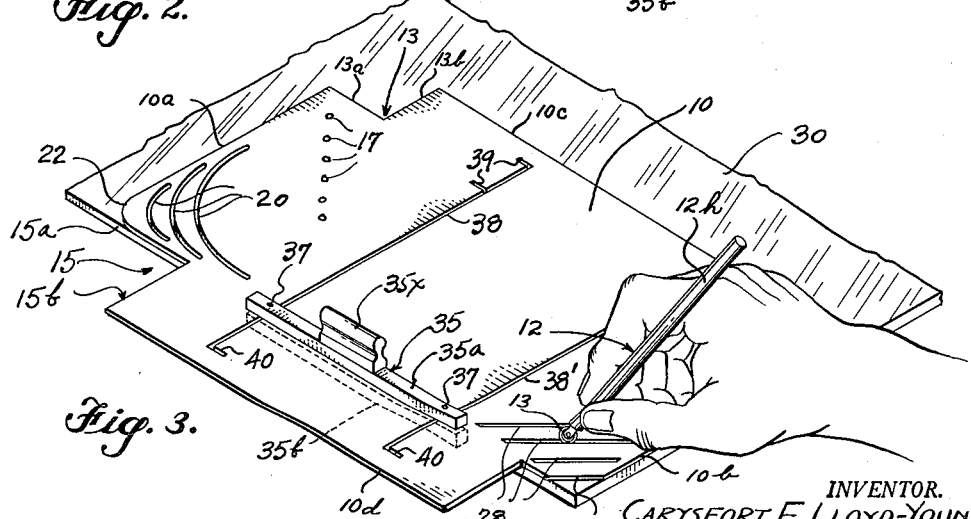
FIG. 3 is a perspective view, showing the gauge of this invention as applied to a pane of glass and also showing the mode of use of a common type of glass cutting tool therewith for making an angle cut across a corner portion of the glass plate.

It is to be understood that the edges that define the various notches, and also the straight line and arcuate slots serve to guide the travel of the cutting tool 13 in its functional application to the gauge plate as has been illustrated in FIG. 3.

Figure 2:
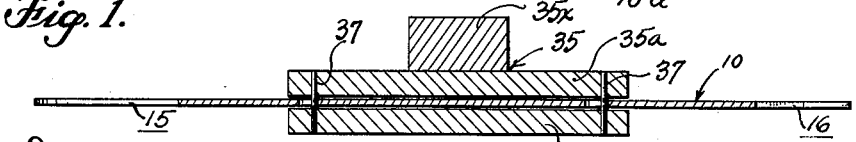
FIG. 2 is a vertical cross-sectional view of the gauge, taken on line 2—2 in FIG. 1.

As an aid in the use of the gauge plate 10 when applied to a plate of glass 30 as in FIG. 3, I have provided it with the guiding and positioning bar 35. This bar comprises a top portion 35a, as shown in FIG. 2, and a complemental bottom portion 35b applied to the underside of the plate; these two parts being in end to end and edge to edge registration at top and undersides of the glass plate 30 and are joined at their ends by pins 37 extended therethrough, and passing through slots 38—38' that are formed in parallel relationship from near the top edge to near the lower edge of the plate 10. At the top edge portion of the plate the slots 38—38' are each formed with a plurality of aligned, laterally directed notches 39 and at their lower ends are similarly formed with a plurality of laterally directed notches 40 extending in the opposite direction; corresponding notches of the two slots being in transverse alignment. The bar 35a is provided with a hand hold member 35x that is easily grasped for sliding adjustment of the bar upwardly or downwardly along the parallel slots 38—38' and may be moved laterally as required to seat the guiding pins 37 in corresponding notches, thus to hold the bar in a set position of use. For example, the bar securing pins 37 may be positioned in paired aligned notches at the upper and lower ends of the slots and thereby held at selected pre-established distances from the plate edges to adapt it for certain uses, or it may be selectively positioned in other notches in paired, transverse alignment at different distances from the plate edge to adapt the plate for other uses.

Assuming the plate to be so constructed, its application and use would be as follows:

For cutting the corner of a glass plate at a 45° angle, the guide bar is first shifted along slots 38—38' and the pins 37 moved into the aligned notches 40—40 that hold the bar edge aligned with the notched edges 15a and 16a. Then the plate 10 is placed flatly upon the glass plate and shifted to dispose the bar 35b against the lower edge of the glass plate as shown in FIG. 3, and the plate edge 10b flush with the right hand edge of the glass plate. This places the slots 28 of the gauge plate 10 in proper relationship to the glass for the 45° bevel cut. The disk 13 of the tool 12 is then inserted in the selected guide slot 28, as in FIG. 2, and the cut made in the usual way.

Corner rounding may be accomplished in a like manner by similar placement of plate 10 and selective use of the arcuate slots 20.

When corner notching is to be done, the bar 35 may be adjusted to the lower set of aligned notches 40—40. This positions the bar for notching to a one inch depth. Use of the gauge bar 35 at top or lower edges of plate 10 is carried on in a like manner.

The graduated edges of the plate 10 provides convenient means for taking measurements or marking points for making cuts.

The specific way of using the gauge depends upon the particular job to be done and it may be used in different ways by different people. As shown, its various details of construction make it a valuable and convenient tool for the many operations of glass cutting.

What I claim as new is:

1. A glass cutting gauge and guide comprising a plate adapted to be disposed flatly upon a sheet of glass that is to be cut and which plate is provided with a straight scribing edge and in its body portion is formed substantially to its full height and coextensive, laterally spaced, parallel slots extending perpendicularly to said scribing edge; said parallel slots having notches directed laterally therefrom at predetermined intervals of spacing from said scribing edge and paired in alignment with each other and parallel with the scribing edge of the plate, a positioning bar mounted on said plate and extending transversely across said slots; said positioning bar comprising upper and lower complemental bars disposed against opposite faces of the plate and joined by pins projecting through the plate slots for guided travel therein and adapted for seating in selected paired notches thereof to establish and maintain the spacing of the bar relative to the scribing edge of the plate.

2. The glass cutting gauge of claim 1 wherein said plate is of rectangular formation and is formed in opposite corner areas with at least one set of cutter guiding slots, with corresponding ends of said slots terminating in an alignment parallel with the scribing edge of said plate, and providing that the disposition of said plate positioning bar against the edge of the plate of glass to be cut will locate the aligned ends of said corner area slots even with the edge of the glass plate.

References Cited in the file of this patent
UNITED STATES PATENTS

| | | |
|---|---|---|
| 170,257 | Hall | Nov. 23, 1875 |
| 368,995 | Dailey et al. | Aug. 30, 1887 |
| 563,830 | Pelley | July 14, 1896 |
| 720,824 | Lieber | Feb. 17, 1903 |
| 2,887,781 | Mills | May 26, 1959 |